(12) United States Patent
Hum

(10) Patent No.: US 8,159,153 B2
(45) Date of Patent: Apr. 17, 2012

(54) LED LIGHT SOURCES WITH IMPROVED THERMAL COMPENSATION

(75) Inventor: David Hum, Livermore, CA (US)

(73) Assignee: Bridgelux, Inc., Livermore, CA (US)

( * ) Notice: Subject to any disclaimer, the term of this patent is extended or adjusted under 35 U.S.C. 154(b) by 0 days.

(21) Appl. No.: 12/896,615

(22) Filed: Oct. 1, 2010

(65) Prior Publication Data

US 2011/0068715 A1    Mar. 24, 2011

(51) Int. Cl.
H05B 37/02    (2006.01)

(52) U.S. Cl. ........ 315/309; 315/113; 315/291; 315/307; 315/324; 362/327; 362/362; 362/373; 362/574

(58) Field of Classification Search ................ 315/113, 315/291, 307, 309, 324; 362/327, 362, 373, 362/574
See application file for complete search history.

(56) References Cited

U.S. PATENT DOCUMENTS

| | | | | |
|---|---|---|---|---|
| 5,803,579 A * | 9/1998 | Turnbull et al. | ............. | 362/516 |
| 7,557,524 B2 * | 7/2009 | Chevalier et al. | ............. | 315/318 |
| 7,796,324 B2 * | 9/2010 | Furuya et al. | ................. | 359/328 |
| 2007/0278974 A1* | 12/2007 | Van De Ven | .................. | 315/324 |
| 2008/0191642 A1* | 8/2008 | Slot et al. | ....................... | 315/295 |
| 2009/0135866 A1* | 5/2009 | Nishimura et al. | ............. | 372/34 |
| 2010/0046221 A1* | 2/2010 | Posselt et al. | ............ | 362/249.02 |
| 2010/0270580 A1* | 10/2010 | Posselt | ........................... | 257/100 |
| 2010/0277077 A1* | 11/2010 | Pong et al. | .................... | 315/152 |

* cited by examiner

*Primary Examiner* — Douglas W Owens
*Assistant Examiner* — Thai Pham
(74) *Attorney, Agent, or Firm* — Calvin B. Ward

(57) ABSTRACT

A compound light source that compensates for changes in electrical conversion efficiency with increasing operating temperature is disclosed. The compound light source generates light of a design intensity at a design temperature in response to a drive current flowing through the light source. The light source includes a primary light source and a compensating light source. The primary and compensating light sources convert an electrical current passing therethrough to light, each light source being characterized by an electrical conversion efficiency that decreases with increasing temperature and that also decreases with increasing current. The compound light source includes a temperature sensor that measures the temperature of the primary light source and a current splitting circuit that divides the drive current between the primary and compensating light sources to compensate for the decrease in efficiency of the primary light source with temperature above the design temperature.

12 Claims, 4 Drawing Sheets

LED LIGHT SOURCES WITH IMPROVED THERMAL COMPENSATION

BACKGROUND OF THE INVENTION

Light emitting diodes (LEDs) are an important class of solid-state devices that convert electric energy to light. Improvements in these devices have resulted in their use in light fixtures designed to replace conventional incandescent and fluorescent light sources. The LEDs have significantly longer lifetimes and, in some cases, significantly higher efficiency for converting electric energy to light.

One class of LED-based light sources that are designed to replace conventional white light sources utilize a "white LED" in combination with a red LED. The white LED is typically constructed from a blue LED that is covered with a phosphor layer that converts a portion of the blue light to yellow light. If the ratio of blue to yellow light in the output spectrum is correct, the light appears to be "white" to a human observer. For some applications, the "color temperature" of the resulting light source is too high. In addition, the output spectrum is less than ideal in terms of its color-rendering index. Accordingly, a red LED can be incorporated with the white LED to fill in the spectrum at long wavelengths and to shift the perceived color of the light source to a lower color temperature. For the purposes of this discussion, a light source constructed from two different types of LEDs will be referred to as a compound light source.

One problem with such compound LED light sources is dependence of the output spectrum on the temperature of the LEDs. The fraction of the electrical power dissipated in the LED that is converted to light will be referred to as the electrical conversion efficiency in the following discussion. The electrical conversion efficiency of an LED typically decreases with increasing temperature. For any given increase in operating temperature, the amount of the decrease depends on the particular type of LED. The electrical conversion efficiency of red LEDs decreases with temperature faster than the electrical conversion efficiency of blue LEDs. Hence, the ratio of red light to blue light in the above-described white light source changes with temperature. This leads to a color shift as the temperature of operation increases. In light sources that are designed to replace conventional incandescent or fluorescent sources, the LEDs often operate at temperatures that are significantly above ambient. The exact operating temperature depends on the specific light source fixture and the ambient temperature.

In addition to the change in electrical conversion efficiency with temperature, the output wavelength of the LEDs also shifts with temperature. For example, the wavelength of light from red LEDs increases with increasing temperature. This shift results in an additional shift in the color temperature of the light source. Accordingly, providing a compound light source that produces light of a predetermined color temperature at all operating temperatures presents engineering challenges.

SUMMARY OF THE INVENTION

The present invention includes a compound light source that compensates for changes in electrical conversion efficiency with increasing operating temperature. The compound light source generates light of a design intensity at a design temperature in response to a drive current flowing through the light source. The light source includes a primary light source and a compensating light source. The primary and compensating light sources convert an electrical current passing therethrough to light, each light source being characterized by an electrical conversion efficiency that decreases with increasing temperature and that also decreases with increasing current. The compound light source also includes a temperature sensor that measures the temperature of the primary light source and a current splitting circuit that divides the drive current between the primary and compensating light sources in response to the measured temperature to compensate for the decrease in efficiency of the primary light source with temperature above the design temperature.

DETAILED DESCRIPTION OF THE PREFERRED EMBODIMENTS OF THE INVENTION

Figure 1:
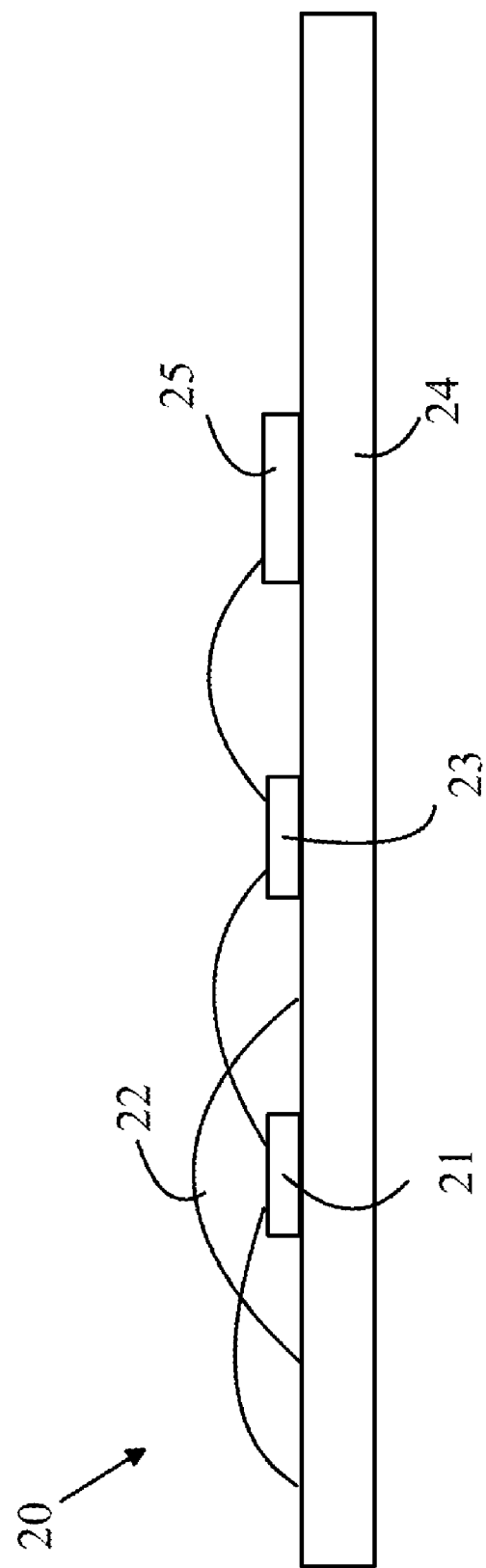
FIG. 1 illustrates a prior art white light source that utilizes a red LED to enhance the output spectrum.

Refer first to FIG. 1, which illustrates a prior art white light source that utilizes a red LED to enhance the output spectrum. Light source 20 includes a blue-emitting LED 21 that is covered by a layer of phosphor 22 that converts part of the blue light to light in the yellow region of the optical spectrum. Light source 20 also includes a red-emitting LED 23. For the purposes of this discussion, it will be assumed that LEDs 21 and 23 are connected in series and powered by a constant current source 25. However, other configurations are utilized and present similar color shift problems. The various components of light source 20 are mounted on a substrate 24 that dissipates the heat generated by the LEDs either to the surrounding air or to a surface on which substrate 24 is mounted. The operating temperature of light source 20 depends on the details of the heat dissipating arrangement. Hence, the shifts in the color temperature arising from the operating temperature cannot always be predicted.

Figure 2:
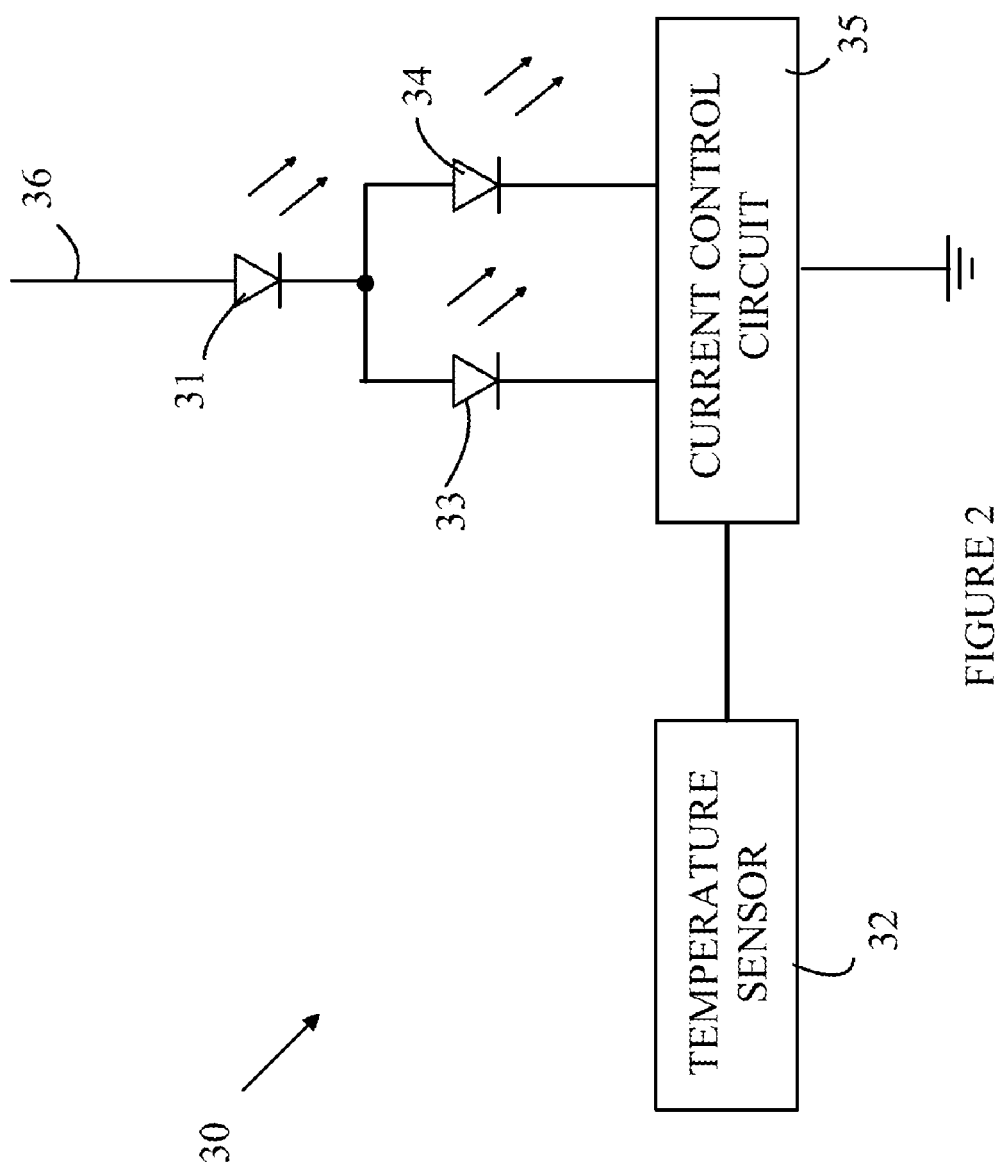
FIG. 2 is a schematic diagram of one embodiment of a light source according to the present invention.

The manner in which the present invention provides its advantages can be more easily understood with reference to FIG. 2, which is a schematic diagram of one embodiment of a light source according to the present invention. Light source 30 includes a blue-emitting LED 31 and two red-emitting LEDs shown at 33 and 34. The blue-emitting LED is covered by a layer of phosphor in a manner analogous to that described above with reference to FIG. 1. The LEDs are powered by a current source connected to lead 36. The current ratio that traverses LED 31 is split between LEDs 33 and 34 by a current control circuit 35. The percentage of the current that goes through each LED is adjusted in response to a temperature sensor 32.

Assume that LED 33 is sized such that when all of the current flows through LED 33 at a predetermined ambient design temperature, the output of light source 30 has the correct color temperature. In this case, no current flows through LED 34. Accordingly, LED 33 will be referred to as the primary LED in the following discussion. As the temperature rises, the efficiency with which LED 33 converts power to light decreases. This would result in the color temperature of light source 30 decreasing if no action were taken. The present invention is based on the observation that if some of the current is shifted to LED 34, the power being dissipated in LED 33 will decrease, and hence, temperature of LED 33 will also decrease. As a result, the electrical conversion efficiency of LED 33 will increase. The light generated by LED 34 provides the light that is lost by running LED 33 at the lower current.

It should be noted that if the two LEDs were merely run such that half the current flowed through each LED all of the time, the light source would be too red. The electrical conversion efficiency decreases with current under the operating conditions that are typically used to drive the red LEDs. If half of the current goes through each LED and the temperature remains at the ambient design temperature, the electrical conversion efficiency will be too high. Hence, the current is shifted to the second LED only as the temperature of LED 33 increases to make up for the loss in electrical conversion efficiency.

As noted above, as the temperature of LED 33 increases, the wavelength of the light generated by LED 33 also decreases. Hence, if LED 34 is identical to LED 33, there will still be some shift in color temperature due to the shift in wavelength. In one aspect of the present invention, LED 34 is chosen such that the wavelength of the light generated by LED 34 is somewhat lower than that of the light generated by LED 33. Hence, as LED 34 is powered up with increasing temperature, the average wavelength of the combination of LED 33 and LED 34 is more nearly constant. For example, the output wavelength of LED 34 could be chosen such that when half of the current is flowing through LED 34, the average wavelength of the light from LEDs 33 and 34 is the same as the average wavelength of the light from LED 33 when that LED is operating at the ambient design temperature.

It should be noted that in any given manufacturing run of LEDs, there is a significant variation in the center emission wavelength and intensity of light generated for a predetermined current. Hence, a red LED having a wavelength that is longer than that of the primary LED could be provided by sorting the LEDs from the manufacturing run and utilizing the LEDs wavelengths that are above the average for LED 34.

The embodiments shown in FIG. 2 utilize three LEDs; however, it is to be understood that each of these LEDs could be replaced with a plurality of LEDs that emit light at the same wavelength. For example, LED 31 could be replaced by a plurality of blue-emitting LEDs connected in parallel, in series, or in a combination of parallel and series connections. Similarly, LED 33 could be replaced by a plurality of red-emitting LEDs connected in parallel, in series, or in a combination of parallel and series connections. Furthermore, the number of red-emitting LEDs that replace LED 33 could be different than the number of blue LEDs that replace LED 31. Further, the number of LEDs that replace LED 34 could be different than the number of LEDs used to replace LED 33.

Figure 3:
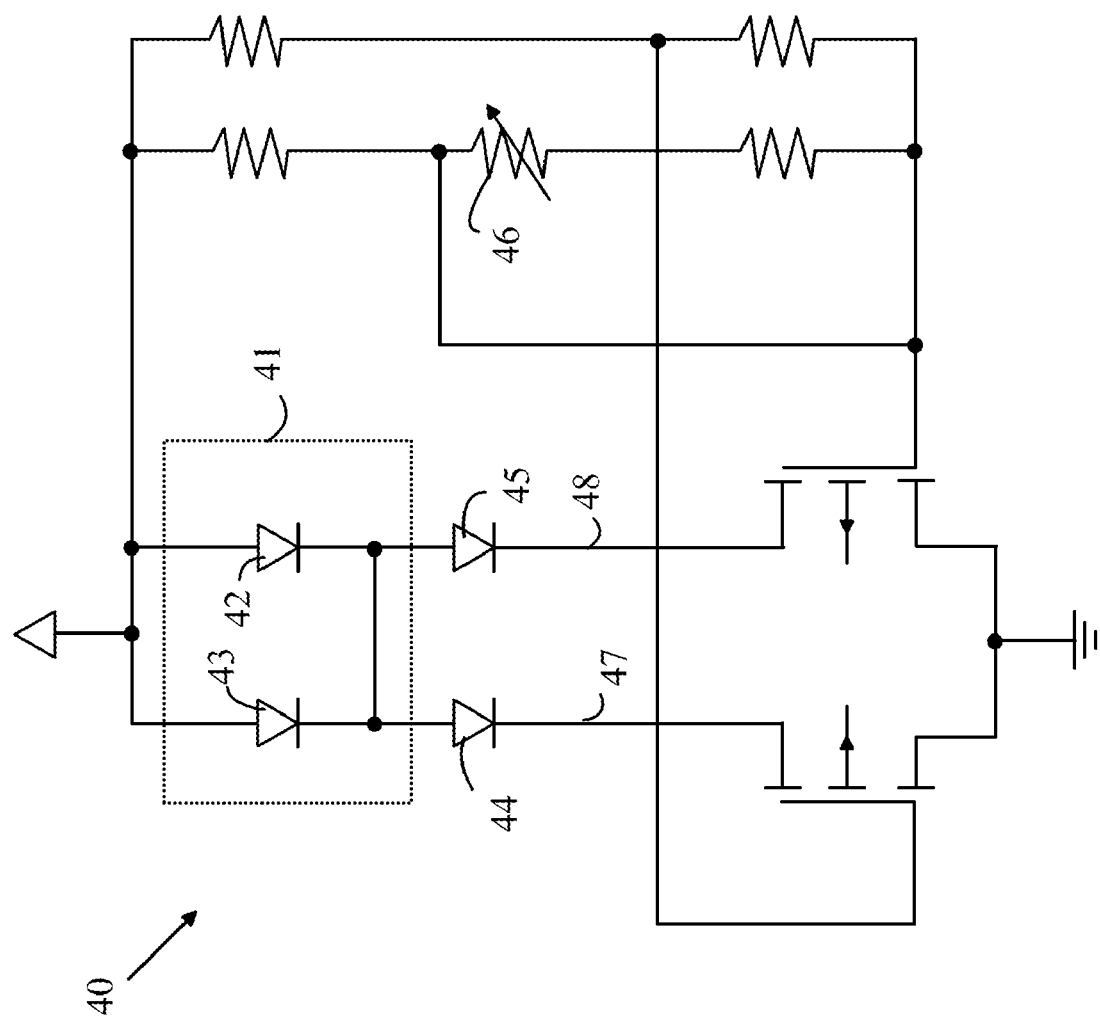
FIG. 3 is a schematic drawing of another embodiment of a light according to the present invention.

Refer now to FIG. 3, which is a schematic drawing of another embodiment of a light according to the present invention. Light source 40 includes a blue light source 41 constructed from two blue LEDs 42 and 43 that are connected in parallel. The blue LEDs are covered by a phosphor layer such that light source 41 generates white light of a first color temperature. A primary red LED 44 alters the color temperature to the desired design color temperature when light source 40 is at a predetermined first temperature. A thermal compensating red LED 45 is utilized to correct for the loss in electrical conversion efficiency of LED 44 with increasing temperature. The temperature sensing function is provided by thermistor 46 that sets the relative currents on paths 47 and 48.

Figure 4:
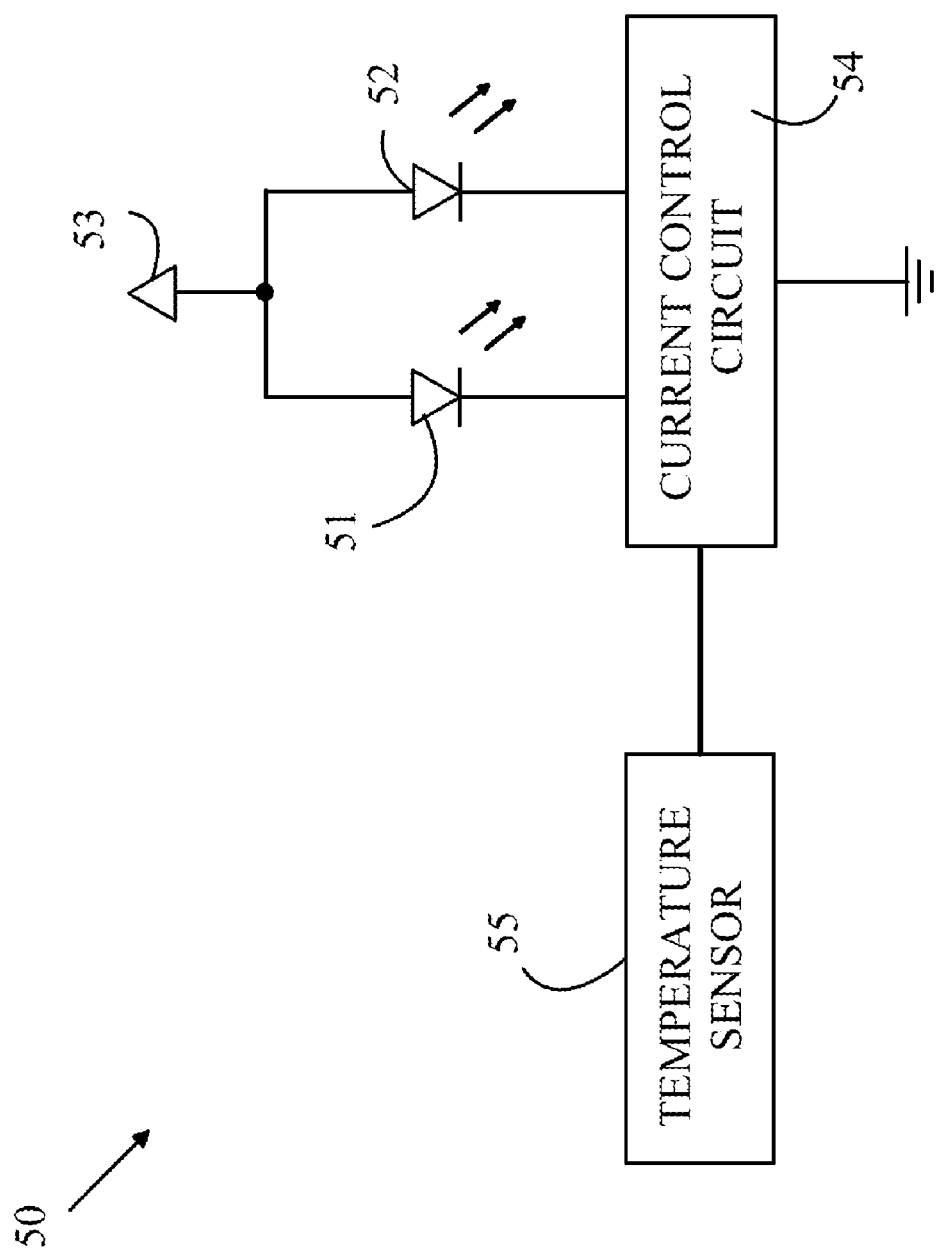
FIG. 4 illustrates another embodiment of a light source according to the present invention.

The above-described embodiments of the present invention have been directed to compensating for temperature caused shifts in the color point of a white LED based phosphor converted light source. However, the principles of the present invention could be applied to other types of LED-based light sources. Refer now to FIG. 4, which illustrates another embodiment of a light source according to the present invention. Light source 50 includes a primary light source 51 that has a decreasing electrical conversion efficiency with temperature and which is driven from a constant current source 53. Light source 50 also includes a compensating light source 52 that generates light in substantially the same output wavelength band as light source 51. Light sources 51 and 52 are connected to a current control circuit 54 that determines the fraction of the current from source 53 that traverses each light source. A temperature sensor 55 senses the temperature of light 51 and causes current control circuit 54 to transfer current from light source 51 to light source 52 as the temperature increases to compensate for the reduction in electrical conversion efficiency in light source 51. If the output spectrum of light source 51 also changes with increasing temperature, light source 52 can be selected such that light source 52 also compensates for the spectral shift by providing light at wavelengths that cause the average wavelength of the output of light source 50 to be more nearly the same as the average wavelength of the output of light source 51 at the lower temperature.

In the above-described embodiments, the compensating LED is only turned on in response to the temperature rising above the ambient temperature. However, embodiments in which some current flows through the compensating LED even at ambient temperature can also be advantageously utilized. The present invention will provide an improvement as long as the compensating LED current does not exceed the current in the primary LED at temperatures below the maximum operating temperature.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A compound light source that generates light of a design intensity at a design temperature in response to a drive current flowing through said light source, said light source comprising:
   a primary light source;
   a compensating light source, said primary and compensating light sources converting an electrical current passing therethrough to light, each light source being characterized by an electrical conversion efficiency that decreases with increasing temperature and that also decreases with increasing current;
   a temperature sensor that measures a temperature of said primary light source; and
   a current splitting circuit that divides said drive current between said primary and compensating light sources in response to said measured temperature to compensate for said decrease in efficiency of said primary light source with temperature changes above said design temperature,
   wherein said compound light source emits light having an optical spectrum characterized by a first average wavelength and wherein said primary light source outputs light of an optical spectrum characterized by an second average wavelength, said second average wavelength changing as a function of said temperature and wherein said compensating light source emits light having a third average wavelength chosen to compensate for said change in said second average wavelength as a function of temperature.

2. A compound light source that generates light of a design intensity at a design temperature in response to a drive current flowing through said light source, said light source comprising:
   a primary light source;
   a compensating light source, said primary and compensating light sources converting an electrical current passing therethrough to light, each light source being characterized by an electrical conversion efficiency that decreases with increasing temperature and that also decreases with increasing current;
   a temperature sensor that measures a temperature of said primary light source; and
   a current splitting circuit that divides said drive current between said primary and compensating light sources in response to said measured temperature to compensate for said decrease in efficiency of said primary light source with temperature changes above said design temperature,
   wherein said primary light source comprises a first LED that emits light at a first wavelength and a second LED that emits light at a second wavelength, said first LED being characterized by a first electrical conversion efficiency and said second LED being characterized by a second electrical conversion efficiency, said first electrical conversion efficiency decreasing with temperature faster than said second electrical conversion efficiency decreases with temperature.

3. The light source of claim 2 wherein said first LED generates white light and said second LED is a first red-emitting LED that alters a color temperature associated with said first LED.

4. The light source of claim 3 wherein said compensating light source comprises a second red-emitting LED.

5. The light source of claim 4 wherein said first and second red-emitting LEDs are constructed from the same material.

6. The light source of claim 5 wherein said first and second red-emitting LED are characterized by first and second average emission wavelengths and wherein said second average emission wavelength is less than said first average emission wavelength.

7. A method for compensating for thermally induced changes in light intensity in a light source that is driven with a drive current, said method comprising:
   providing a primary light source;
   providing a compensating light source, said primary and compensating light sources converting an electrical current passing therethrough to light, each light source being characterized by an electrical conversion efficiency that decreases with increasing temperature and that also decreases with increasing current;
   measuring a temperature of said primary light source; and
   dividing said drive current between said primary and compensating light sources in response to said measured temperature to compensate for said decrease in efficiency of said primary light source with temperature,
   wherein said compound light source emits light having an optical spectrum characterized by a first average wavelength and wherein said primary light source outputs light of an optical spectrum characterized by an second average wavelength, said second average wavelength changing as a function of said temperature and wherein said compensating light source emits light having a third average wavelength chosen to compensate for said change in said second average wavelength as a function of temperature.

8. A method for compensating for thermally induced changes in light intensity in a light source that is driven with a drive current, said method comprising:
   providing a primary light source;
   providing a compensating light source, said primary and compensating light sources converting an electrical current passing therethrough to light, each light source being characterized by an electrical conversion efficiency that decreases with increasing temperature and that also decreases with increasing current;
   measuring a temperature of said primary light source; and
   dividing said drive current between said primary and compensating light sources in response to said measured temperature to compensate for said decrease in efficiency of said primary light source with temperature,
   wherein said primary light source comprises a first LED that emits light at a first wavelength and a second LED that emits light at a second wavelength, said first LED being characterized by a first electrical conversion efficiency and said second LED being characterized by a second electrical conversion efficiency, said first electrical conversion efficiency decreasing with temperature faster than said second electrical conversion efficiency decreases with temperature.

9. The method of claim 8 wherein said first LED generates white light and said second LED is a first red-emitting LED that alters a color temperature associated with said first LED.

10. The method of claim 9 wherein said compensating light source comprises a second red-emitting LED.

11. The method of claim 10 wherein said first and second red-emitting LEDs are constructed from the same material.

12. The method of claim 11 wherein said first and second red-emitting LED are characterized by first and second average emission wavelengths and wherein said second average emission wavelength is less than said first average emission wavelength.

* * * * *